US008363526B2

(12) United States Patent  (10) Patent No.: US 8,363,526 B2
Hotta et al.  (45) Date of Patent: Jan. 29, 2013

(54) OPTICAL PICKUP APPARATUS

(75) Inventors: Tohru Hotta, Okaya (JP); Ryoichi Kawasaki, Isesaki (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 0 days.

(21) Appl. No.: 12/915,643

(22) Filed: Oct. 29, 2010

(65) Prior Publication Data

US 2011/0103215 A1  May 5, 2011

(30) Foreign Application Priority Data

Oct. 30, 2009  (JP) .................................. 2009-250621

(51) Int. Cl.
*G11B 7/125* (2006.01)
(52) U.S. Cl. ................... 369/53.28; 369/112.08; 369/94
(58) Field of Classification Search .................... None
See application file for complete search history.

(56) References Cited

U.S. PATENT DOCUMENTS 5,892,748 A * 4/1999 Kikuchi ................... 369/112.07
6,240,054 B1 * 5/2001 Takeya et al. ............... 369/44.29
6,307,820 B2 * 10/2001 Takeya et al. ............... 369/44.29
7,978,568 B2 * 7/2011 Yamasaki et al. ........... 369/44.11

FOREIGN PATENT DOCUMENTS

JP  08-315402  11/1996
JP  2006-147069  6/2006
JP  2009-199676  9/2009

* cited by examiner

*Primary Examiner* — Joseph Haley
*Assistant Examiner* — Parpul Gupta
(74) *Attorney, Agent, or Firm* — SoCal IP Law Grouping LLP; Steven C. Sereboff; John E. Gunther

(57) ABSTRACT

An optical pickup apparatus, which reads signals recorded on first and second signal recording layers of an optical disc, includes: a laser diode; an objective lens to condense a laser beam to the first and second signal recording layers; and a collimating lens disposed in a light path of the laser beam between the laser diode and the objective lens and configured to correct a spherical aberration by moving in a light axis direction of the laser beam, and the objective lens includes a bifocal lens and is configured such that a second focal point does not coincide in position with the second signal recording layer when a first focal point coincides in position with the first signal recording layer, and the first focal point does not coincide in position with the first signal recording layer when the second focal point coincides in position with the second signal recording layer.

4 Claims, 3 Drawing Sheets

OPTICAL PICKUP APPARATUS

CROSS-REFERENCE TO RELATED APPLICATION

This application claims the benefit of priority to Japanese Patent Application No. 2009-250621, filed Oct. 30, 2009, of which full contents are incorporated herein by reference.

BACKGROUND OF THE INVENTION

1. Field of the Invention

The present invention relates to an optical pickup apparatus that performs an operation of reading signals recorded in an optical disc and an operation of recording signals into an optical disc with a laser beam.

2. Description of the Related Art

Optical disc apparatuses are widely used that can apply a laser beam emitted from an optical pickup apparatus to a signal recording layer of an optical disc to perform a signal reproducing operation and a signal recording operation.

Although optical disc apparatuses using optical discs called CD and DVD are generally used, optical disc apparatuses are recently commercialized that use optical discs with record densities improved, i.e., optical discs of the Blu-ray standard.

A laser beam having a shorter wavelength, e.g., blue-violet light having a wavelength of 405 nm is used as a laser beam for performing an operation of reading signals recorded in a Blu-ray standard optical disc. A protective layer provided on a top surface of a signal recording layer of the Blu-ray standard optical disc has a thickness of 0.1 mm, and a numerical aperture of an objective lens is specified at 0.85 which is used for performing the operation of reading signals from the signal recording layer.

The optical pickup apparatus is configured so as to be capable of controlling a drive current that is supplied to a laser diode to acquire a laser output suitable for reading signals recorded in an optical disc or to acquire a laser output suitable for recording signals into an optical disc.

The optical pickup apparatus is configured so as to be capable of performing a control operation for focusing a spot, which is formed through an operation of condensing a laser beam emitted from a laser diode by an objective lens, onto a signal recording layer of an optical disc, i.e., a focusing control operation, and a control operation for causing a spot of a laser beam to follow a signal track, i.e., a tracking control operation.

The optical pickup apparatus has such a problem that an aberration called a spherical aberration is caused due to a thickness of a protective layer located between a surface of an optical disc, i.e., an incident surface of a laser beam and a signal recording and an operation of reproducing signals and/or an operation of recording signals is not normally performed. Thus, an art for solving such a problem has been developed.

Among recent optical discs, a two-layer optical disc having two signal recording layers is commercialized as a product in order to increase a signal recording capacity. Although an operation of moving an objective lens in a light axis direction is performed in order to read signals recorded on the signal recording layers included in such a two-layer optical disc, a large spherical aberration is caused when an operation of jumping to a different signal recording layer is performed, since a transparent protective layer, which is provided between each of the signal recording layers and the incident surface of the laser beam, significantly changes in thickness.

Such an art has been developed that the spherical aberration, caused due to the operation of jumping between the signal recording layers, is corrected through an operation of moving a collimating lens in the light axis direction.

Some optical pickup apparatuses are configured such that operations of reading signals recorded in optical discs of two standards having protective layers different in thicknesses are performed by using an objective lens provided with a plurality of focal points (see Japanese Laid-Open Patent Publication Nos. 2006-147069, 2009-199676, and 8-315402).

The optical pickup apparatus described in Japanese Laid-Open Patent Publication No. 2009-199676 is configured such that an operation of correcting the spherical aberration, which is caused due to change in thickness of the protective layer, is performed by moving the collimating lens in the light axis direction, when an operation of moving a position of light condensed by the objective lens, i.e., a position of a focal point, is executed in order to perform an operation of reading signals recorded on one signal recording layer after performing an operation of reading signals recorded on the other signal recording layer.

Description will then be given of the operation of correcting the spherical aberration when a conventional optical pickup apparatus is used for reading signals recorded on signal recording layers of a two-layer optical disc specified by the Blu-ray standard.

In the two-layer optical disc of the Blu-ray standard, specifications are such that 0.075 mm is a distance between the surface and a first signal recording layer provided in a location closer to the surface of the optical disc, and 0.1 mm is a distance between the surface and a second signal recording layer provided in a location further from the surface of the optical disc.

As apparent from such specifications, is 0.025 mm is a distance between the first signal recording layer and the second signal recording layer, and a spherical aberration is caused based on such a difference in thickness of the protective layer. The operation of moving the collimating lens in the light axis direction is performed in the optical pickup apparatus in order to correct such a spherical aberration.

When a thickness of the protective layer is changed by 0.001 mm in such an optical disc, a spherical aberration of 10 m$\lambda$rms is caused. Since a thickness of the protective layer is 0.025 mm between the first signal recording layer and the second signal recording layer, if a laser-beam condensed position is moved from the first signal recording layer to the second signal recording layer or from the second signal recording layer to the first signal recording layer by the operation of moving the objective lens in the light axis direction, a spherical aberration of 10 m$\lambda$rms×25=250 m$\lambda$rms is caused.

In an optical pickup apparatus configured such that signals recorded on the first signal recording layer and the second signal recording layer included in a two-layer optical disc are read with a spot formed by the condensing operation of a single-focus objective lens, a distance that the objective lens is moved is substantially equal to a distance between the layers. Since an amount of a spherical aberration changes in accordance with the movement distance of the objective lens and changes in proportion to a thickness of a protective layer, an amount of the spherical aberration increases as the movement distance of the objective lens increases.

On the other hand, in an optical pickup apparatus configured such that a spherical aberration of 18 m$\lambda$rms can be corrected when the collimating lens is moved by 0.1 mm in the light axis direction, the collimating lens is required to be moved by 0.1×250/18=1.39 mm in the light axis direction in order to perform the operation of correcting the spherical aberration of 250 mλrms, and therefore, an amount of moving the collimating lens becomes greater.

If such an amount of moving the collimating lens becomes greater, not only the optical pickup apparatus becomes greater in shape but also a time for moving the collimating lens becomes longer, and therefore such a problem arises that a longer time is required for achieving a state where the operation of reading signals recorded on the signal recording layers is performed in the jump operation.

SUMMARY OF THE INVENTION

An optical pickup apparatus according to an aspect of the present invention, which reads signals recorded on a first signal recording layer and a second signal recording layer different from the first signal recoding layer in distance from a surface of an optical disc, the optical pickup apparatus, comprises: a laser diode configured to emit a laser beam; an objective lens configured to condense the laser beam to the first signal recording layer, and condense the laser beam to the second signal recording layer; and a collimating lens disposed in a light path of the laser beam between the laser diode and the objective lens, the collimating lens configured to correct a spherical aberration by moving in a light axis direction of the laser beam, the objective lens including a bifocal lens having a first focal point and a second focal point different from the first focal point in focal distance, the objective lens configured such that the second focal point does not coincide in position with the second signal recording layer when the first focal point coincides in position with the first signal recording layer, and the first focal point does not coincide in position with the first signal recording layer when the second focal point coincides in position with the second signal recording layer.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

Figure 1:
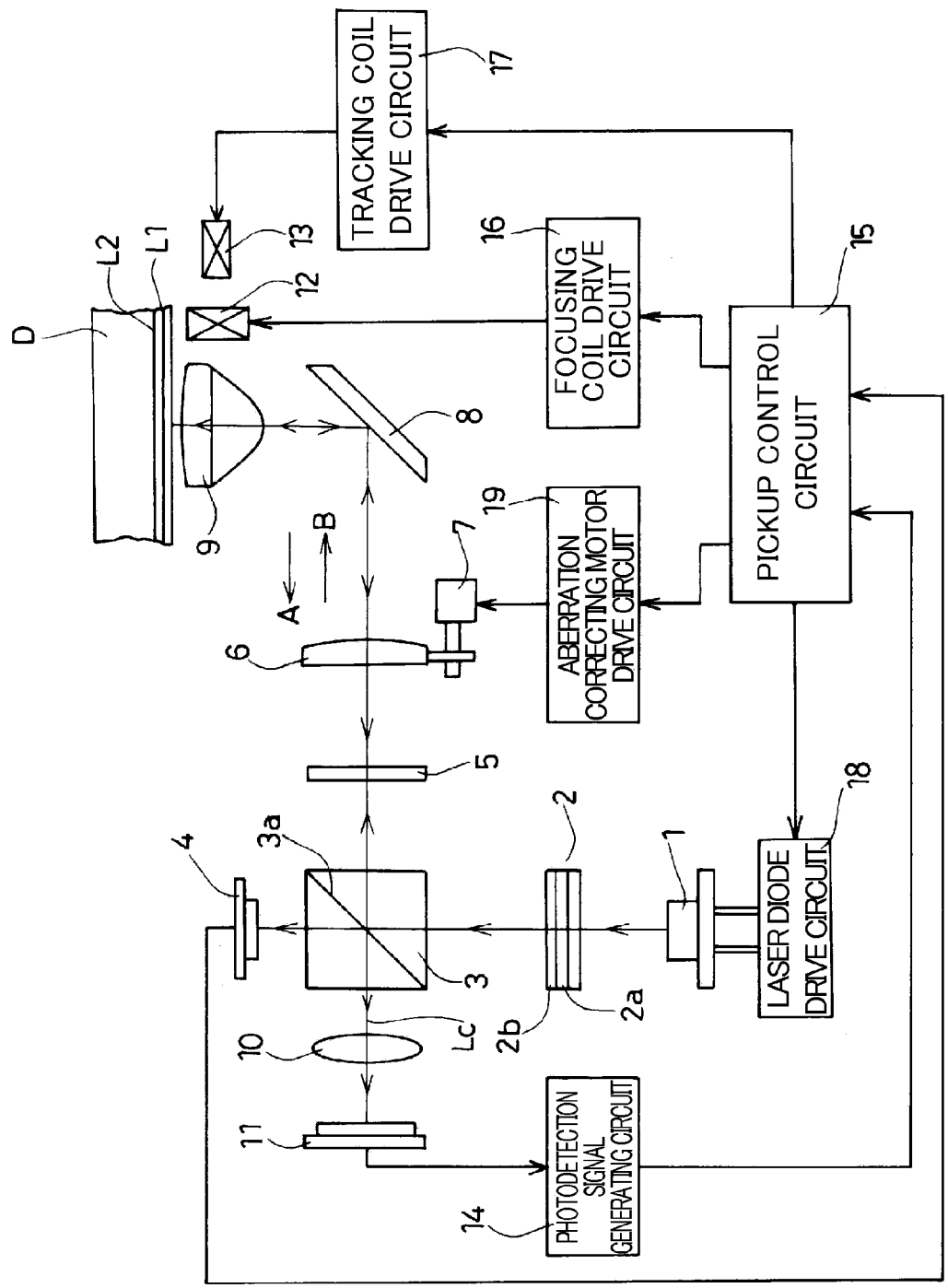
FIG. 1 is a schematic diagram illustrating operations of an optical pickup apparatus according to an embodiment of the present invention.

At least the following details will become apparent from descriptions of this specification and of the accompanying drawings.

An optical pickup apparatus according to an embodiment of the present invention includes: a laser diode configured to emit a laser beam; an objective lens configured to condense the laser beam emitted from the laser diode to a first signal recording layer, and condense the laser beam to a second signal recording layer included in an optical disc; and a collimating lens disposed in a light path between the laser diode and the objective lens and the collimating lens configured to correct a spherical aberration through an operation of moving in light axis direction. The objective lens includes a bifocal lens having a first focal point and a second focal point different in focal distance from the first focal point, and the objective lens is configured such that the second focal point is located in a position different from that of the second signal recording layer when the first focal point coincides in position with the first signal recording layer; and the first focal point is located in a position different from that of the first signal recording layer when the second focal point coincides in position with the second signal recording layer.

In the optical pickup apparatus according to an embodiment of the present invention, a distance D2 between the first focal point and the second focal point is set such that a relationship of D1>D2 is satisfied where D1 represents a distance between the first signal recording layer and the second signal recording layer.

In the optical pickup apparatus according to an embodiment of the present invention, an annular diffraction zone is formed in the objective lens so that two focal points, i.e., the first focal point and the second focal point are formed.

In the optical pickup apparatus according to an embodiment of the present invention, the objective lens includes a bifocal lens having the first focal point with a shorter focal distance and the second focal point with a longer focal distance, and the operation of reading signals recorded on the first signal recording layer is performed using a laser beam condensed to the first focal point; and the operation of reading signals recorded on the second signal recording layer is performed using a laser beam condensed to the second focal point.

In the optical pickup apparatus according to an embodiment of the present invention, when the operation of reading signals recorded on the first signal recording layer is performed with a laser beam condensed to the first focal point and when the operation of reading signals recorded on the second signal recording layer is performed using a laser beam condensed to the second focal point, the spherical aberration is corrected through the operation of moving the collimating lens.

In the optical pickup apparatus according to an embodiment of the present invention, the objective lens includes a bifocal lens having the first focal point and the second focal point different in focal distance from the first focal point, the second focal point is located in a position different from that of the second signal recording layer when the first focal point coincides in position with the first signal recording layer, and the first focal point is located in a position different from that of the first signal recording layer when the second focal point coincides in position with the second signal recording layer. Thus, an amount of moving the objective lens in the light axis direction can be reduced by respectively performing the operations of reading signals recorded on the first signal recording layer and the second signal recording layer with spots formed in different focal point positions. Therefore, according to the optical pickup apparatus according to an embodiment of the present invention, an amount can be reduced of moving the collimating lens that performs the operation of correcting the spherical aberration, and as a result, not only the optical pickup apparatus can be reduced in size, but also a time can be reduced that is required for achieving the state where the reading operation of reading signals recorded on the signal recording layers is performed in the operation of jumping between the signal recording layers.

The optical pickup apparatus according to an embodiment of the present invention is configured such that signals recorded on the first signal recording layer and the second signal recording layer included in an optical disc are read with a spot condensed by the bifocal objective lens having different focal points, thereby reducing the distance of moving the objective lens in the light axis direction.

FIG. 1 is a schematic diagram illustrating operations of the optical pickup apparatus according to an embodiment of the present invention and the description will be made of the case where an optical pickup apparatus is implemented which is configured to read signals recorded on signal recording layers of a two-layer optical disc D of the Blu-ray standard.

The two-layer optical disc D of the Blu-ray standard includes a first signal recording layer L1 at a position closer to the surface of the optical disc, and includes a second signal recording layer L2 at a position further from the surface. In such a configuration, a distance between the first signal recording layer L1 and the surface is defined as 0.075 mm and a distance between the second signal recording layer L2 and the surface is defined as 0.1 mm.

In FIG. 1, reference numeral 1 denotes a laser diode configured to emit a blue-violet laser beam having a wavelength of 405 nm, for example, and reference numeral 2 denotes a diffraction grating on which the laser beam emitted from the laser diode 1 is incident and the diffraction grating includes: a diffraction grating unit 2a configured to split the laser beam into a main beam of zero-order light and two sub-beams of plus first-order light and minus first-order light; and a half-wave plate 2b configured to convert the incident laser beam into linear polarized light in the S-direction.

Reference numeral 3 denotes a polarizing beam splitter on which an incident laser beam having passed through the diffraction grating 2 and the polarizing beam splitter is provided with a control film 3a configured to reflect a great portion of the S-polarized laser beam and allow the laser beam polarized in the P-direction to pass therethrough. Reference numeral 4 denotes a monitor photodetector provided at a position where the laser beam, emitted from the laser diode 1 and having passed through the control film 3a of the polarizing beam splitter 3, is applied, and the detection output thereof is used to control the output of the laser beam emitted from the laser diode 1.

Reference numeral 5 denotes a quarter-wave plate provided at a position on which the laser beam reflected by the control film 3a of the polarizing beam splitter 3 is incident, and the quarter-wave plate has an action of converting the incident laser beam from linear polarized light into circular polarized light and from circular polarized light into linear polarized light. Reference numeral 6 denotes a collimating lens on which the laser beam having passed through the quarter-wave plate 5 is incident and which converts the incident laser beam into parallel light, and the collimating lens is configured to be moved in the light axis direction, i.e., directions of arrows A and B by an aberration correcting motor 7. A configuration is such that the spherical aberration caused due to a thickness of a protective layer of the optical disc D is corrected by the movement operation of the collimating lens 6 in the light axis direction.

Reference numeral 8 denotes a raising mirror provided at a position on which the laser beam having passed through the collimating lens 6 is incident, to reflect the incident laser beam toward an objective lens 9. The objective lens 9 is formed with an annular diffraction zone, which is described later, and is configured so as to be capable of focusing the laser beam on a first focal point and a second focal point having focal distances different from each other due to the action of the annular diffraction zone.

In such a configuration, a laser beam emitted from the laser diode 1 is made incident on the objective lens 9 via the diffraction grating 2, the polarizing beam splitter 3, the quarter-wave plate 5, the collimating lens 6, and the raising mirror 8, and thereafter, is applied as a spot to the first signal recording layer L1 or the second signal recording layer L2 of the optical disc D through the condensing operation of the objective lens 9, and the laser beam applied to the signal recording layers is reflected as return light.

The return light reflected by the signal recording layers of the optical disc D is made incident on the reflection film 3a of the polarizing beam splitter 3 through the objective lens 9, the raising mirror 8, the collimating lens 6, and the quarter-wave plate 5. The return light made incident on the reflection film 3a of the polarizing beam splitter 3 in such a manner has been converted into linear polarized light in the P-direction due to a phase shift operation of the quarter-wave plate 5. Therefore, such return light is not reflected by the reflection film 3a and passes therethrough as a control laser beam Lc.

Reference numeral 10 denotes a sensor lens on which the incident control laser light Lc, having passed through the reflection film 3a of the polarizing beam splitter 3, is incident, and the sensor lens has an action of condensing and applying the control laser light Lc to a light-receiving unit provided on a photodetector 11 called PDIC. The photodetector 11 is provided with a well-known quad sensor, etc., and is configured to perform a signal generation operation associated with an operation of reading signals recorded on the signal recording layers of the optical disc D and a signal generation operation for executing a focusing control operation by an astigmatic method through the irradiation operation of the main beam, and to perform a signal generation operation for executing a tracking control operation through the irradiation operation of the two sub-beams.

The optical pickup apparatus according to an embodiment of the present invention is configured as described above and, in such a configuration, the objective lens 9 is fixed to a lens holding frame (not shown) supported by four or six support wires on a base of the optical pickup apparatus so as to be capable of a movement operation in the vertical direction relative to the signal surface of the optical disc D, i.e., the focusing direction, and a movement operation in the radial direction of the optical disc D, i.e., the tracking direction.

Reference numeral 12 denotes a focusing coil provided on the lens holding frame to which the objective lens 9 is fixed, and the focusing coil has an action of moving the objective lens 9 in the focusing direction, i.e., the light axis direction in cooperation with a magnet fixed to the base. Reference numeral 13 denotes a tracking coil provided on the lens holding frame to which the objective lens 9 is fixed, and the tracking coil has an action of moving the objective lens 9 in the tracking direction in cooperation with the magnet fixed to the base.

Reference numeral 14 denotes a photodetection signal generating circuit configured to generate an RF signal, which is a signal acquired correspondingly to the operation of reading signals recorded on the signal recording layers of the optical disc D from the sensor for receiving the main beam included in the photodetector 11, a focus error signal, which is a signal acquired from the sensor for receiving the main beam in accordance with a focusing operation for a laser beam, and a tracking error signal, which is a signal acquired from the sensor for receiving the sub-beams in accordance with a tracking operation for a laser beam.

Reference numeral 15 denotes a pickup control circuit configured to perform various control operations for the optical pickup apparatus based on the signals obtained from the monitor photodetector 4 and the photodetection signal generating circuit 14. Reference numeral 16 denotes a focusing coil drive circuit having a focus control signal input thereto, which is output from the pickup control circuit 15 based on the focus error signal that is generated and input from the photodetection signal generating circuit 14, and the focusing coil driving circuit is configured to supply a drive signal to the focusing coil 12. Reference numeral 17 denotes a tracking coil drive circuit having a tracking control signal input thereto, which is output from the pickup control circuit 15 based on the tracking error signal that is generated and input from the photodetection signal generating circuit 14, and the tracking coil driving circuit is configured to supply a drive signal to the tracking coil 13.

Reference numeral 18 denotes a laser diode drive circuit that supplies a drive signal to the laser diode 1, and the laser diode drive circuit is configured to adjust the laser output with a control signal that is output from the pickup control circuit 15 based on a monitor signal obtained from the monitor photodetector 4. Reference numeral 19 denotes an aberration correcting motor drive circuit configured to supply a drive signal to the aberration correcting motor 7 to move the collimating lens 6 in the light axis direction by an operation of rotating the aberration correcting motor 7 to correct the spherical aberration, and the aberration correcting motor drive circuit is configured to be controlled by the pickup control circuit 15.

The optical pickup apparatus according to an embodiment of the present invention is configured as described above, and the condensing operation of the objective lens 9 for the first signal recording layer L1 and the second signal recording layer L2 will then be described with reference to FIGS. 2 and 3.

An annular diffraction zone (not shown) is formed on the surface of the objective lens 9 having the laser light incident thereon which is emitted from the laser diode 1 according to an embodiment of the present invention. This annular diffraction zone is formed such that the cross section thereof is in a sawtooth form as described in Japanese Laid-Open Patent Publication No. 2006-107680, for example.

Figure 2:
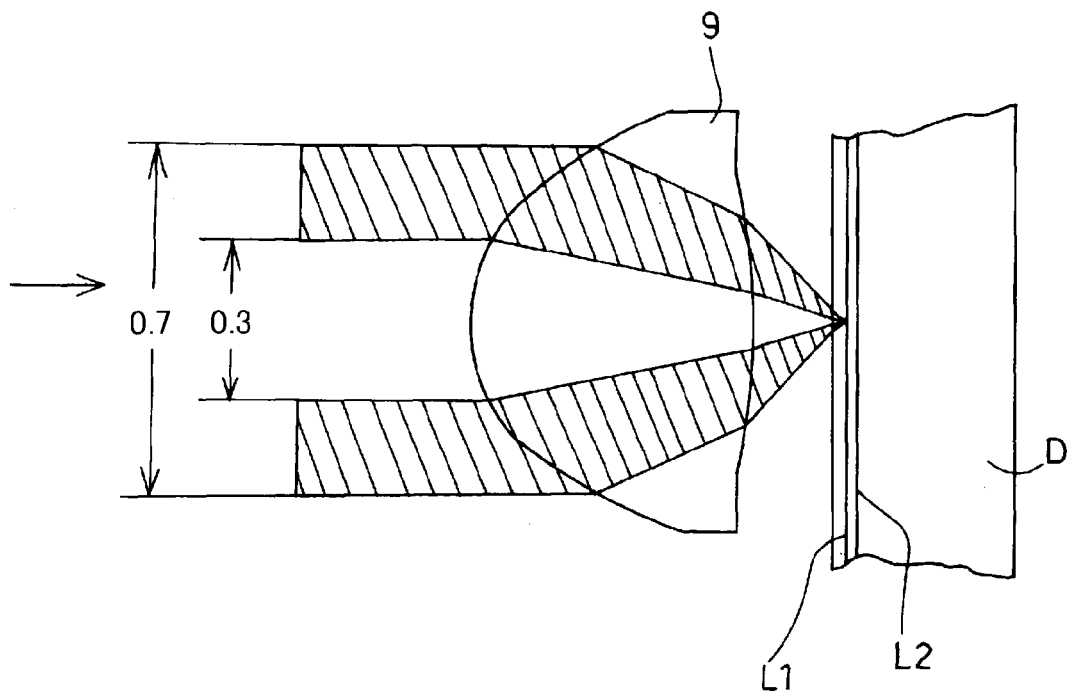
FIG. 2 is a diagram illustrating a relationship between an objective lens included in an optical pickup apparatus and an optical disc according to an embodiment of the present invention.
Figure 3:
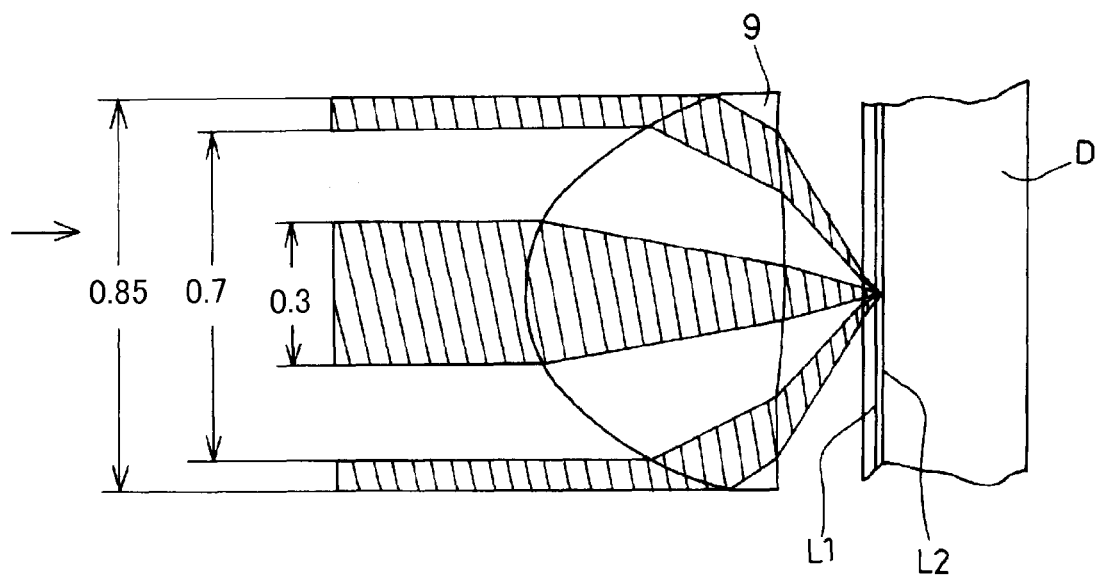
FIG. 3 is another diagram illustrating a relationship between an objective lens included in an optical pickup apparatus and an optical disc according to an embodiment of the present invention.

In such a configuration, as depicted in FIGS. 2 and 3, the laser beam emitted from the laser diode 1 is made incident on the objective lens 9 in the direction of an arrow as parallel light, for example.

FIG. 2 depicts a relationship between the laser beam and the first signal recording layer L1 and the second signal recording layer L2 when the laser beam is condensed on the first signal recording layer L1 included in the optical disc D by the condensing operation of the objective lens 9 to the first focal point, and the annular diffraction zone is formed on the surface of the objective lens 9 such that the laser beam in a shaded portion is condensed on the first signal recording layer L1.

When the operation of reading signals recorded on the first signal recording layer L1 is performed, the laser beam is condensed onto the first signal recording layer L1 with the use of the annular diffraction zone formed on the objective lens 9, and in an embodiment of the present invention, a configuration is such that the first-order diffracted light passing through the objective lens 9 in a range of 0.3 to 0.7 of the numerical aperture is condensed to the first focal point as depicted.

FIG. 3 depicts a relationship between the laser beam and the first and second signal recording layers L1 and L2 when the laser beam is condensed onto the second signal recording layer L2 included in the optical disc D by the condensing operation of the objective lens 9 to the second focal point, and the annular diffraction zone is formed on the surface of the objective lens 9 such that the laser beam in a shaded portion is condensed onto the second signal recording layer L2.

When the operation of reading signals recorded in the second signal recording layer L2 is performed, the laser beam is condensed onto the second signal recording layer L2 by the annular diffraction zone formed on the objective lens 9, and in an embodiment of the present invention, a configuration is such that the fifth-order diffracted light, which passes through the objective lens 9 in ranges of 0.3 or less of the numerical aperture and 0.7 to 0.85 of the numerical aperture, is condensed to the second focal point as depicted.

Figure 4:
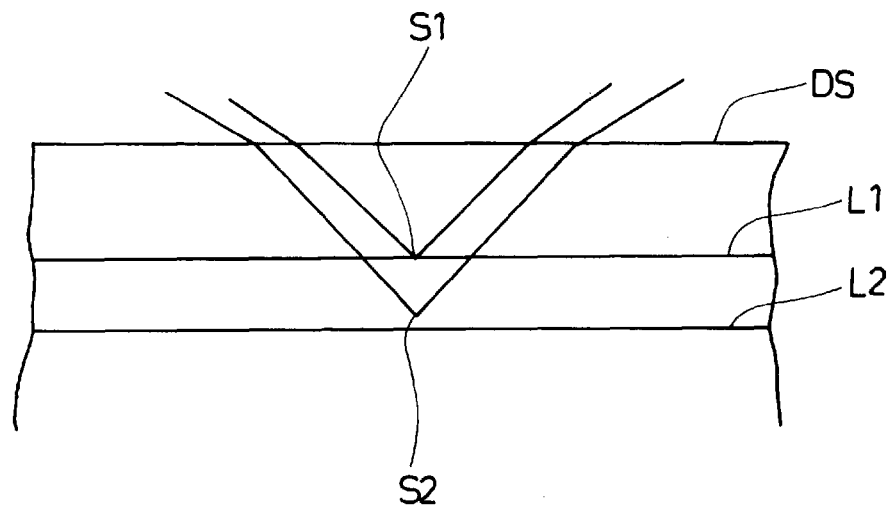
FIG. 4 is a diagram illustrating a relationship between a laser beam and an optical disc in an optical pickup apparatus according to an embodiment of the present invention.
Figure 5:
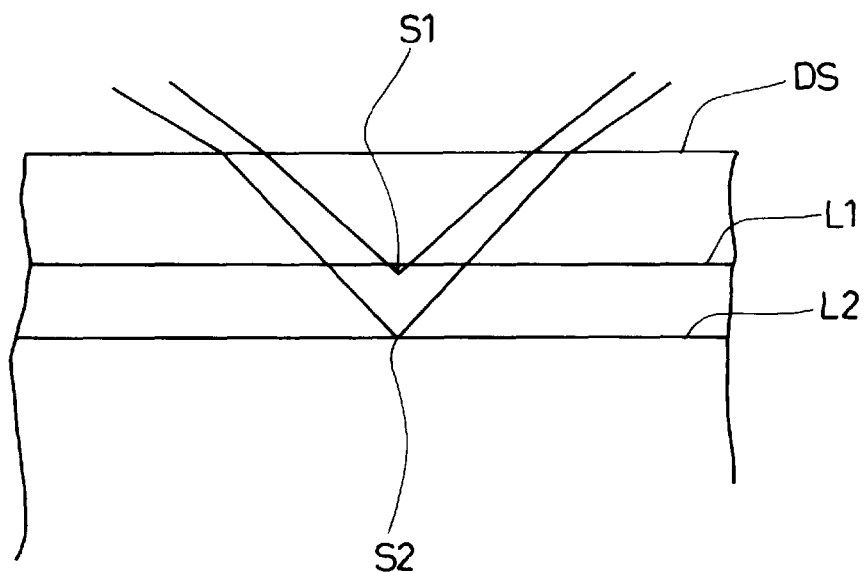
FIG. 5 is another diagram illustrating a relationship between a laser beam and an optical disc in an optical pickup apparatus according to an embodiment of the present invention

As described above, the operation of reading signals recorded on the first signal recording layer L1 is performed with the spot that is formed by condensing the laser light to the first focal point, and the operation of reading signals recorded on the second signal recording layer L2 is performed with the spot that is formed by condensing the laser light to the second focal point, and a description will then be given of a relationship between the first focal point and the second focal point with reference to FIGS. 4 and 5.

FIG. 4 depicts a state where the position of the first focal point S1 of the objective lens 9 coincides with the position of the first signal recording layer L1, and a configuration is such that, in this state, the second focal point S2 is located in front of the second signal recording layer L2 (when viewed from a surface DS of the optical disc D). A configuration is such that, in this state, a spot is formed which is unable to perform the operation of reading signals recorded on the second signal recording layer L2 with the laser beam condensed to the second focal point S2 and which does not have an adverse effect on the operation of reading signals recorded on the first signal recording layer L1.

FIG. 5 depicts a state where the position of the second focal point S2 of the objective lens 9 coincides with the position of the second signal recording layer L2, and a configuration is such that, in this state, the first focal point S1 is located beyond the first signal recording layer L1 (when viewed from the surface DS of the optical disc D). A configuration is such that, in this state, a spot is formed which is unable to perform the operation of reading signals recorded on the first signal recording layer L1 with the laser beam condensed to the first focal point S1, and which does not have an adverse effect on the operation of reading signals recorded on the second signal recording layer L2.

In the optical pickup apparatus according to an embodiment of the present invention, a configuration is such that the second focal point S2 is located in front of the second signal recording layer L2 when the first focal point S1 of the objective lens 9 coincides in position with the first signal recording layer L1, and that the first focal point S1 is located beyond the first signal recording layer L1 when the second focal point S2 of the objective lens 9 coincides in position with the second signal recording layer L2. However, a positional relationship between the first focal point S1 and the second focal point S2 is not limited to this, and a configuration may be such that the second focal point S2 is located beyond the second signal recording layer L2 when the first focal point S1 of the objective lens 9 coincides in position with the first signal recording layer L1, and that the first focal point S1 is located in front of the first signal recording layer L1 when the second focal point S2 of the objective lens 9 coincides in position with the second signal recording layer L2.

That is, a configuration may be such that the second focal point S2 does not coincide in position with the second signal recording layer L2 when the first focal point S1 coincides in position with the first signal recording layer L1, and the first focal point S1 does not coincide in position with the first signal recording layer L1 when the second focal point S2 coincides in position with the second signal recording layer L2. The optical pickup apparatus according to an embodiment of the present invention is configured as described above, and the operations thereof will then be described.

When an operation is executed for performing the operation of reading signals recorded on the first signal recording layer L1, the pickup control circuit 15 supplies drive control signals to the circuits included in the optical pickup apparatus. The laser diode drive circuit 18 supplies a drive signal for obtaining a laser output which has been set in advance for the laser diode 1, and the laser diode 1 emits a laser beam with a desired output.

the laser beam emitted from the laser diode 1 is incident on the diffraction grating 2, is divided into a main beam and sub-beams by the diffraction grating unit 2a included in the diffraction grating 2, and is converted into the linear polarized light in the S-direction by the half-wave plate 2b. The laser beam having passed through the diffraction grating 2 is incident on the polarizing beam splitter 3, and the control film 3a included in the polarizing beam splitter 3 reflects a large portion of the laser beam and allows a portion of the laser beam to pass therethrough.

Since the laser beam having passed through the control film 3a is applied to the monitor photodetector 4, a signal corresponding to the level of the applied laser beam is input as a monitor signal to the pickup control circuit 15. When the monitor signal is input, a control signal based on the level of the monitor signal is supplied from the pickup control circuit 15 to the laser diode drive circuit 18. Therefore, if a configuration is made such that the level of the drive signal, which is supplied from the pickup control circuit 15 to the laser diode drive circuit 18, is controlled so as to become a predetermined value, the output of the laser beam emitted from the laser diode 1 can automatically be controlled so as to become a desired level. This operation is referred to as an automatic laser output control operation.

The laser beam reflected by the control film 3a included in the polarizing beam splitter 3 is incident on the quarter-wave plate 5, to be converted from linear polarized light into circular polarized light, and is then incident on the collimating lens 6. The laser beam incident on the collimating lens 6 is converted into parallel light and is incident on the raising mirror 8.

The laser beam incident on the raising mirror 8 is reflected by the raising mirror 8, and is then incident on the objective lens 9. The laser beam is incident on the objective lens 9 through the optical path described above, so that the condensing operation by the objective lens 9 is performed.

The condensing operation by the objective lens 9 for the first signal recording layer L1 is performed by performing the operation of moving the objective lens 9 to a position closer to the optical disc D from a position distant therefrom, for example. When this operation is performed, a focus error signal obtained from the first signal recording layer L1 and a focus error signal obtained from the second signal recording layer L2 can be detected. Therefore, the first signal recording layer L1 can be distinguished from the second signal recording layer L2 by discriminating between the focus error signals acquired in such a manner.

The operation of moving the objective lens 9 described above is performed by supplying a drive signal from the focusing coil drive circuit 16 to the focusing coil 12, and this causes a condensing control operation for the first signal recording layer L1 which is performed by the condensing operation to the first focal point S1 by the objective lens 9 as depicted in FIG. 2. When the condensing operation to the first signal recording layer L1 is performed, the laser beam reflected from the first signal recording layer L1 is incident, as the return light, on the objective lens 9 from the optical disc D side.

The return light incident on the objective lens 9 is incident on the control film 3a included in the polarizing beam splitter 3 through the raising mirror 8, the collimating lens 6, and the quarter-wave plate 5. Since the return light incident on the control film 3a has been converted by the quarter-wave plate 5 into the linear polarized light in the P-direction, the return light is not reflected by the control film 3a and the whole of the light passes therethrough as the control laser light Lc.

The control laser light Lc, i.e., the return light having passed through the control film 3a is incident on the sensor lens 10 and is applied to the photodetector 11 with astigmatism added thereto by the sensor lens 10. As a result of applying the control laser light Lc to the photodetector 11, a detection signal can be obtained from the quad sensor included in the photodetector 11 based on positions and changes in shapes of the irradiation spots of the main beam and the sub-beams.

In such a state, the focus error signal and the tracking error signal, which are generated from the photodetection signal generating circuit 14 based on the detection signal obtained from the photodetector 11, are input to the pickup control circuit 15. When the focus error signal and the tracking error signal are input to the pickup control circuit 15, control signals based on the error signals are output to the focusing coil drive circuit 16 and the tracking coil drive circuit 17. As a result, a control signal is supplied from the focusing coil drive circuit 16 to the focusing coil 12, and thus the operation of moving the objective lens 9 in the focusing direction is performed by the focusing coil 12 so that the focusing control operation can be performed of condensing the laser beam to the first signal recording layer L1. A control signal is supplied from the tracking coil drive circuit 17 to the tracking coil 13, and thus the operation of moving the objective lens 9 in the tracking direction is performed by the tracking coil 13 so that the tracking control operation can be performed to allow the laser beam to follow the signal track provided on the first signal recording layer L1.

Since the focusing control operation and the tracking control operation are performed in the optical pickup apparatus as described above, the operation can be performed of reading signals recorded on the first signal recording layer L1 of the optical disc D. A reproduction signal obtained through this reading operation can be obtained as information data by demodulating an RF signal generated from the photodetection signal generating circuit 14 as is well known.

The operation of reading signals recorded on the first signal recording layer L1 is performed with the spot of the laser beam that is condensed to the first focal point S1 as described above, and a configuration is such that, in the state where such a reading operation is performed, the collimating lens 6 is moved to an operation position at which the spherical aberration with respect to the first signal recording layer L1 is minimized through a rotation drive operation in response to the driving signal supplied from the aberration correcting motor drive circuit 19 to the aberration correcting motor 7. This operation of moving the collimating lens 6 to the aberration correcting position can be performed by moving the lens to a position at which a jitter value contained in a reproduction signal becomes an optimum value or a position at which an RF signal is maximized in level, for example.

By performing the spherical aberration correcting operation described above, the spherical aberration can be minimized that occurs in the spot of the laser beam which is incident on the objective lens 9 and is applied to the first signal recording layer L1 of the optical disc D. By performing this operation, the operation of reading signals recorded on the first signal recording layer L1 included in the optical disc D can be performed in the optimum state.

The operation of reading signals recorded on the first signal recording layer L1 is performed with the spot condensed to the first focal point S1 of the objective lens 9 and formed as described above. A configuration is such that, while this operation is performed, the second focal point S2 is located in a position in front of the second signal recording layer L2 as depicted in FIG. 4, and not only the operation of reading signals recorded on the second signal recording layer L2 is not performed but also an adverse effect is not caused on the reading operation performed with the optical pickup apparatus utilizing the spot which is condensed to the first focal point S1 and formed. Therefore, the operation of reading signals recorded on the first signal recording layer L1 can be performed with the spot condensed to the first focal point S1 and formed without trouble.

The operation of reading signals recorded on the first signal recording layer L1 is performed as described above, and a description will then be given of a case where the operation of reading signals recorded on the second signal recording layer L2.

This operation is performed similarly to the condensing operation by the objective lens 9 for the second signal recording layer L2. That is, the condensing operation by the objective lens 9 for the second signal recording layer L2 is performed by performing the operation of moving the objective lens 9 to a position closer to the optical disc D from a position distant therefrom, for example. When this operation is performed, a focus error signal obtained from the first signal recording layer L1 and a focus error signal obtained from the second signal recording layer L2 can be detected. Therefore, the first signal recording layer L1 can be distinguished from the second signal recording layer L2 by discriminating between the focus error signals obtained in such a manner.

The operation of moving the objective lens 9 described above is performed by supplying a drive signal from the focusing coil drive circuit 16 to the focusing coil 12, and this causes a condensing control operation for the second signal recording layer L2 which is performed by the condensing operation to the second focal point S2 by the objective lens 9 as depicted in FIG. 3. When the condensing operation to the second signal recording layer L2 is performed, the laser beam reflected from the second signal recording layer L2 is incident, as the return light, on the objective lens 9 from the optical disc D side.

The return light incident on the objective lens 9 is incident on the control film 3a included in the polarizing beam splitter 3 through the raising mirror 8, the collimating lens 6, and the quarter-wave plate 5. Since the return light incident on the control film 3a has been converted by the quarter-wave plate 5 into the linear polarized light in the P-direction, the return light is not reflected by the control film 3a and the whole of the light passes therethrough as the control laser light Lc.

The control laser light Lc, i.e., the return light having passed through the control film 3a is incident on the sensor lens 10 and is applied to the photodetector 11 with astigmatism added thereto by the sensor lens 10. As a result of applying the control laser light Lc to the photodetector 11, a detection signal can be obtained from the quad sensor included in the photodetector 11 based on positions and changes in shapes of the irradiation spots of the main beam and the sub-beams.

In such a state, the focus error signal and the tracking error signal, which are generated from the photodetection signal generating circuit 14 based on the detection signal obtained from the photodetector 11, are input to the pickup control circuit 15. When the focus error signal and the tracking error signal are input to the pickup control circuit 15, control signals based on the error signals are output to the focusing coil drive circuit 16 and the tracking coil drive circuit 17. As a result, a control signal is supplied from the focusing coil drive circuit 16 to the focusing coil 12, and thus the operation of moving the objective lens 9 in the focusing direction is performed by the focusing coil 12 so that the focusing control operation can be performed of condensing the laser beam to the second signal recording layer L2. A control signal is supplied from the tracking coil drive circuit 17 to the tracking coil 13, and thus the operation of moving the objective lens 9 in the tracking direction is performed by the tracking coil 13 so that the tracking control operation can be performed to allow the laser beam to follow the signal track provided on the second signal recording layer L2.

Since the focusing control operation and the tracking control operation are performed in the optical pickup apparatus as described above, the operation can be performed of reading signals recorded on the second signal recording layer L2 of the optical disc D. A reproduction signal obtained through this reading operation can be obtained as information data by demodulating an RF signal generated from the photodetection signal generating circuit 14 as is well known.

The operation of reading signals recorded on the second signal recording layer L2 is performed with the spot of the laser beam that is condensed to the second focal point S2 as described above, and a configuration is such that, in the state where such a reading operation is performed, the collimating lens 6 is moved to an operation position at which the spherical aberration with respect to the second signal recording layer L2 is minimized through a rotation drive operation in response to the driving signal supplied from the aberration correcting motor drive circuit 19 to the aberration correcting motor 7. This operation of moving the collimating lens 6 to the aberration correcting position can be performed by moving the lens to a position at which a jitter value contained in a reproduction signal becomes an optimum value or a position at which an RF signal is maximized in level, for example.

By performing the spherical aberration correcting operation described above, the spherical aberration can be minimized that occurs in the spot of the laser beam which is incident on the objective lens 9 and is applied to the second signal recording layer L2 of the optical disc D. By performing this operation, the operation of reading signals recorded on the second signal recording layer L2 included in the optical disc D can be performed in the optimum state.

The operation of reading signals recorded on the second signal recording layer L2 is performed with the spot condensed to the second focal point S2 of the objective lens 9 and formed as described above. A configuration is such that, while this operation is performed, the first focal point S1 is located in a position beyond the first signal recording layer L1 as depicted in FIG. 5, and not only the reading operation of reading signals recorded on the first signal recording layer L1 is not performed but also an adverse effect is not caused on the reading operation performed with the optical pickup apparatus utilizing the spot which is condensed to the second focal point S2 and formed. Therefore, the operation of reading signals recorded on the second signal recording layer L2 can be performed with the spot condensed to the second focal point S2 and formed without trouble.

The operations of reading signals recorded on the first signal recording layer L1 and the second signal recording layer L2 included in the optical disc D are performed by the optical pickup apparatus according to an embodiment of the present invention as described above, and a description will then be given to the first focal point S1 and the second focal point S2 of the objective lens 9 and the operation of moving the collimating lens 6 for the spherical aberration correcting operation.

The two-layer optical disc D of the Blu-ray standard is specified such that a distance between the surface of the optical disc and the first signal recording layer L1 is 0.075 mm and a distance between the second signal recording layer L2 and the surface is 0.1 mm as described above.

In an embodiment of the present invention, for example, when the position of the first focal point S1 coincides with the position of the first signal recording layer L1 as depicted in FIG. 4, i.e., when the first focal point S1 is located in the position at which a distance from the surface DS of the optical disc D is 0.075 mm, the second focal point S2 is set to be located in the position at which a distance from the surface DS is 0.095 mm. Therefore, in such a state, a distance from the position of the second focal point S2 to the second signal recording layer L2 results in 0.005 mm.

Similarly, when the position of the second focal point S2 coincides with the position of the second signal recording layer L2 in a similar way as depicted in FIG. 5, i.e., when the second focal point S2 is located in the position at which a distance from the surface DS of the optical disc D is 0.1 mm, the first focal point S1 is set to be located in the position at which a distance from the surface DS is 0.08 mm. Therefore, in such a state, a distance from the position of the first focal point S1 to the first signal recording layer L1 is set at 0.005 mm.

As apparent from the description, a transition operation from the state, where the operation of reading signals recorded on the first signal recording layer L1 is performed as depicted in FIG. 4, to the state, where the operation of reading signals recorded on the second signal recording layer L2 is performed as depicted in FIG. 5, i.e., the jump operation between the signal recording layers, can be performed by moving the objective lens 9 by 0.005 mm.

That is, a distance that the objective lens 9 is moved in the light axis direction for performing the jump operation between the signal recording layers is 0.005 mm, which is one fifth of the conventional distance, i.e., 0.025 mm. Therefore, an amount of change in the spherical aberration caused in association with the movement of the objective lens 9 also results in one fifth, and as a result, an amount of the movement of the collimating lens 6 which is moved for correcting the spherical aberration can result in one fifth.

In the optical pickup apparatus according to an embodiment of the present invention, since the distance can be reduced that the objective lens 9 is moved when the jump operation between the signal recording layers is performed, the movement amount can be reduced of the collimating lens that performs the operation of correcting the spherical aberration, and as a result, not only the optical pickup apparatus can be reduced in size but also a time can be reduced which is required for achieving a state where the operation of reading signals recorded on the signal recording layers is performed in the jump operation between the signal recording layers.

As described above, the difference in focal distance between the first focal point S1 and the second focal point S2 (in the protective layer included in the optical disc D) is 0.095 mm-0.075 mm=0.02 mm. Although a description has been given assuming that the difference in focal distance between the first focal point S1 and the second focal point S2 is 0.02 mm in such an embodiment of the present invention, the signal reading operation can be performed without trouble as long as the difference is within 0.01 mm to 0.02 mm.

Further, if the distances are set to satisfy a relationship of D1>D2, where D1 represents a distance between the first signal recording layer L1 and the second signal recording layer L2 and D2 represents a distance between the first focal point S1 and the second focal point S2, not only the operation of moving the objective lens 9 in the light axis direction can efficiently be performed for performing the operation of reading signals recorded on the first signal recording layer L1 and the second signal recording layer L2, but also the operating distance of the objective lens 9 can easily be designed.

In an embodiment of the present invention, the annular diffraction zone is formed on the objective lens 9 so that the first-order diffraction light is used as the laser beam for performing the operation of reading signals recorded on the first signal recording layer L1 and the fifth-order diffraction light is used as the laser beam for performing the operation of reading signals recorded on the second signal recording layer L2, however, the order of the diffraction light to be used is not limited and can variously be changed. Although a bifocal lens is manufactured with the annular diffraction zone formed on the incident surface of the objective lens 9, the bifocal lens can also be manufactured with a curvature of a mother spherical surface designed without the annular diffraction zone provided.

Further, a description has been given of a case where the spherical aberration associated with a change in thickness of the protective layer between the signal recording layers is corrected by the operation of moving the collimating lens 6, however, a configuration can be such that an operation of correcting the spherical aberration generated in association with a change in refractive index of the objective lens 9 due to temperature change or hygroscopicity can also be corrected by the adjusting movement operation of the collimating lens 6.

A description is given of a case where an embodiment of the present invention is employed in the optical pickup apparatus that performs the operation of reading signals recorded in an optical disc of the Blu-ray standard, however, an embodiment of the present invention is applicable to optical pickup apparatuses of different standards.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An optical pickup apparatus configured to read signals recorded on a first signal recording layer and a second signal recording layer different from the first signal recording layer in distance from a surface of an optical disc including the first and second signal recording layers, the optical pickup apparatus comprising:
   a laser diode configured to emit a laser beam;
   a bifocal objective lens having a first focal point to condense a first portion of the laser beam to the first signal recording layer, and a second focal point to condense a second portion of the laser beam to the second signal recording layer, the first and second focal points differing in focus distance, the objective lens further configured such that a first distance between the first focal point and the second focal point is shorter than a second distance between the first signal recording layer and the second signal recording layer;

a collimating lens disposed in a light path of the laser beam between the laser diode and the objective lens, the collimating lens configured to correct a spherical aberration by moving in a light axis direction of the laser beam; and a focus mechanism configured to change between reading the signals recorded on the first signal recording layer and the signals recorded on the second signal recording layer by moving the objective lens between a first position, at which the first portion of the laser beam is condensed to the first signal recording layer, and a second position, at which the second portion of the laser beam is condensed to the second signal recording layer.

2. The optical pickup apparatus of claim 1, wherein the objective lens includes:

a first annular diffraction zone configured to form the first focal point; and a second annular diffraction zone configured to form the second focal point.

3. The optical pickup apparatus of claim 1, wherein when the first focal point coincides in position with the first signal recording layer, a signal recorded on the first signal recording layer is read with the first portion of the laser beam condensed to the first focal point, and wherein when the second focal point coincides in position with the second signal recording layer, a signal recorded on the second signal recording layer is read with the second portion of the laser beam condensed to the second focal point.

4. The optical pickup apparatus of claim 3, wherein when the signal recorded on the first signal recording layer is read with the first portion of the laser beam condensed to the first focal point, and when the signal recorded on the second signal recording layer is read with the second portion of the laser beam condensed to the second focal point, the collimating lens corrects the spherical aberration by moving in the light axis direction of the laser beam.

* * * * *